United States Patent
Harima et al.

(10) Patent No.: US 12,219,085 B2
(45) Date of Patent: Feb. 4, 2025

(54) MULTIPLE DWELLING HOUSE INTERPHONE SYSTEM

(71) Applicant: Aiphone Co., Ltd., Nagoya (JP)

(72) Inventors: Hirokazu Harima, Nagoya (JP); Hiroki Koto, Nagoya (JP); Kimiaki Fujishima, Nagoya (JP); Ryoji Uno, Nagoya (JP)

(73) Assignee: AIPHONE CO., LTD., Nagoya (JP)

( * ) Notice: Subject to any disclaimer, the term of this patent is extended or adjusted under 35 U.S.C. 154(b) by 443 days.

(21) Appl. No.: 17/656,018

(22) Filed: Mar. 23, 2022

(65) Prior Publication Data
US 2022/0385766 A1    Dec. 1, 2022

(30) Foreign Application Priority Data
May 25, 2021 (JP) ................. 2021-087842

(51) Int. Cl.
*H04M 11/02* (2006.01)
*H04M 9/00* (2006.01)

(52) U.S. Cl.
CPC ......... *H04M 11/025* (2013.01); *H04M 9/001* (2013.01)

(58) Field of Classification Search
CPC ............................ H04M 11/025; H04M 9/001
See application file for complete search history.

(56) References Cited

U.S. PATENT DOCUMENTS

| | | | | |
|---|---|---|---|---|
| 4,370,675 A | * | 1/1983 | Cohn | H04M 11/025 348/706 |
| 9,235,976 B2 | * | 1/2016 | Sloo | G08B 21/182 |
| 11,893,795 B2 | * | 2/2024 | Finlayson | G06F 3/165 |
| 11,973,896 B2 | * | 4/2024 | White | H04M 3/566 |

(Continued)

FOREIGN PATENT DOCUMENTS

| | | |
|---|---|---|
| JP | 2005-242980 A | 9/2005 |
| JP | 2007-174228 A | 7/2007 |
| JP | 2019-186704 A | 10/2019 |

OTHER PUBLICATIONS

Extended European Search Report dated Nov. 29, 2022 (Application No. 22163790.3).

*Primary Examiner* — Lisa Hashem
(74) *Attorney, Agent, or Firm* — BURR PATENT LAW, PLLC (57) ABSTRACT

A multiple dwelling house interphone system includes a communication management device that controls communication between the collective entrance machine and the mobile phone. The communication management device relays the communication to the mobile phone registered as a calling destination of the collective entrance machine to be linked to the dwelling room master device using a predetermined application based on a VOIP. When a predetermined registration operation to allow communication with the communication management device based on the VOIP is performed to link the mobile phone to the dwelling room master device, information list on mobile phones already registered relative to the dwelling room master device as a (Continued)

link target is transmitted from the communication management device having accepted the registration in addition to an application for a download, and the mobile phone that has downloaded the application displays the information list on a display section of the mobile phone.

8 Claims, 6 Drawing Sheets

(56) References Cited

U.S. PATENT DOCUMENTS

| | | |
|---|---|---|
| 12,052,494 B2 * | 7/2024 | Mysore ................ H04N 23/651 |
| 2016/0373909 A1 * | 12/2016 | Rasmussen ............. H04W 4/80 |
| 2019/0230226 A1 | 7/2019 | Kawamura et al. |
| 2023/0206706 A1 * | 6/2023 | Schoenfelder ...... H04L 12/2816 |
| | | 340/5.7 |
| 2024/0046642 A1 * | 2/2024 | Jorasch ................. G06V 40/10 |

* cited by examiner

MULTIPLE DWELLING HOUSE INTERPHONE SYSTEM

BACKGROUND OF INVENTION

Technical Field

The disclosure relates to a multiple dwelling house interphone system, especially relates to a technique for deleting dweller information registered in a multiple dwelling house interphone system when a dweller moves out.

Background Art

In a multiple dwelling house interphone system, since it is necessary to update registered information when dwellers move in and out, there is a function to delete the registered information about a former dweller.

For example, in JP 2007-174228 A, a function to initialize all the setting contents and a function to initialize a content set by a dweller are provided, and the initialization of the content set by a dweller is possible when the dweller moves out.

In a multiple dwelling house interphone system configured to communicate with a mobile phone via a communication management device, such as a server, installed on a network, information on dwellers is accumulated also in the communication management device. For example, when a multiple dwelling house interphone system has a function to communicate with a mobile phone, such as a smartphone, via an application of a communication management device, it is necessary to delete information of a telephone number of the mobile phone and the like for certain in the application and the communication management device when a dweller moves out. However, the technique described in JP 2007-174228 A is not configured to delete the information in the communication management device. Therefore, an erase operation is not simple, and the information was easily left undeleted even after the erase operation has been performed.

Further, there has been a multiple dwelling house interphone system with a premise of not including a dwelling room master device itself, where a mobile phone is used instead as the dwelling room master device. In such a system, since the erase operation is performed on the mobile phone, further cumbersomeness is to be expected.

Therefore, in consideration of the problem, it is an object of the disclosure to provide a multiple dwelling house interphone system that allows deletion of information needing erasure through a simple operation even when the information is regarding a mobile phone registered in the communication management device.

SUMMARY OF THE INVENTION

In order to solve the above-described problem, there is provided a multiple dwelling house interphone system according to a first aspect of the disclosure. The multiple dwelling house interphone system is configured to respond to a call from a collective entrance machine installed at an entrance. The response can be made not only through a dwelling room master device installed in an individual dwelling unit, but also through a mobile phone carried by a dweller. The multiple dwelling house interphone system includes a communication management device that transmits a call signal from the collective entrance machine to the mobile phone and controls communication between the collective entrance machine and the mobile phone. The communication management device relays the communication to the mobile phone registered as the calling destination of the collective entrance machine. The registered mobile phone is linked to the dwelling room master device using a predetermined application based on a VOIP (Voice Over Internet Protocol). When a predetermined registration operation to allow communication with the communication management device based on VOIP is performed to link the mobile phone to the dwelling room master device, the communication management device accepts the registration and transmits an application for download. In addition, a list of information on mobile phones already registered with the linked target dwelling room master device is transmitted. The mobile phone that has downloaded the application displays the list of information in the display section.

With the configuration, the information already registered in the communication management device is transmitted to the mobile phone in the process of linking the mobile phone to the dwelling room master device. If undeleted registered information on a former dweller remains when a new dweller moves in, it can be noticed. Accordingly, it is easy to recognize if there is undeleted information needing erasure, thus allowing certain erasure of information on the former dweller while registering the information on the new dweller.

Note that the application is an abbreviation for application software.

In a second aspect of the disclosure, which is in the configuration according to the first aspect, the mobile phone that has downloaded the application and is linked to the dwelling room master device displays the information list in the display section when the application is started. In addition, a delete button configured to delete any piece of information in the list is displayed, allowing any piece of information in the displayed information list to be deleted.

With the configuration, since the information already registered in the communication management device can be displayed on the mobile phone, and any piece of information in the registered information can be deleted, unnecessary information can be erased for certain with a simple operation.

In a third aspect of the disclosure, which is in the configuration according to the first aspect, the dwelling room master device includes a registration operation section and a monitor. The registration operation section obtains a ticket for registering the mobile phone in the communication management device. The monitor displays the obtained registration ticket. In the registration operation, the registration ticket displayed on the dwelling room master device is read by the mobile phone.

With the configuration, since the registration can be performed using the registration ticket displayed on the dwelling room master device, the registration can be made with a simple operation.

In a fourth aspect of the disclosure, which is in the configuration according to the first aspect, the dwelling room master device is configured to display the information list of the mobile phones already registered to be linked to the dwelling room master device in the communication management device through a predetermined operation. The dwelling room master device further includes an erase operation section configured to delete any piece of the information in the displayed information list.

With the configuration, the dwelling room master device can obtain and display the information list of mobile phones registered and linked with the dwelling room master device, and further, the dwelling room master device can erase any of the information regarding a mobile phone among them. Therefore, the information needing erasure can be easily grasped, and unnecessary information can be erased through a simple operation.

There is provided a multiple dwelling house interphone system according to a fifth aspect of the disclosure. The multiple dwelling house interphone system includes a collective entrance machine, a terminal, and a communication management device. The collective entrance machine is installed at an entrance for calling a dweller. The portable terminal that can be carried by a dweller is configured to respond to the call from the collective entrance machine via an external network. The communication management device controls communication between the collective entrance machine and the terminal. The terminal is a mobile phone configured to perform a communication based on a VOIP. The mobile phone as a calling destination is registered in the communication management device in association with a dwelling unit number, and the communication management device relays the communication between the collective entrance machine and the mobile phone using a predetermined application that uses the VOIP. The mobile phone can download an application to communicate with the communication management device based on VOIP through a predetermined operation. Information list of the mobile phones already registered in the communication management device in association with the registered dwelling unit number is displayed on the mobile phone that has downloaded the application.

With the configuration, when a mobile phone is registered as a terminal that can respond to a call from the collective entrance machine, the information already registered in the communication management device is displayed. If undeleted registered information on a former dweller remains when a new dweller moves in, it can be recognised. Accordingly, the information needing erasure may easily be noticed, and a situation in which information of the former dweller remains when the information on the new dweller is registered can be prevented.

According to the disclosure, since the information already registered in the communication management device is transmitted to the mobile phone in the process of registering the mobile phone to be linked to the dwelling room master device, if there is an undeleted registered information on a former dweller when a new dweller moves in, it can be noticed. Accordingly, it is easy to recognize that the information needing to be erased is left, thus allowing certain erasure of information on the former dweller when registering the information on the new dweller.

DETAILED DESCRIPTION

Figure 1:
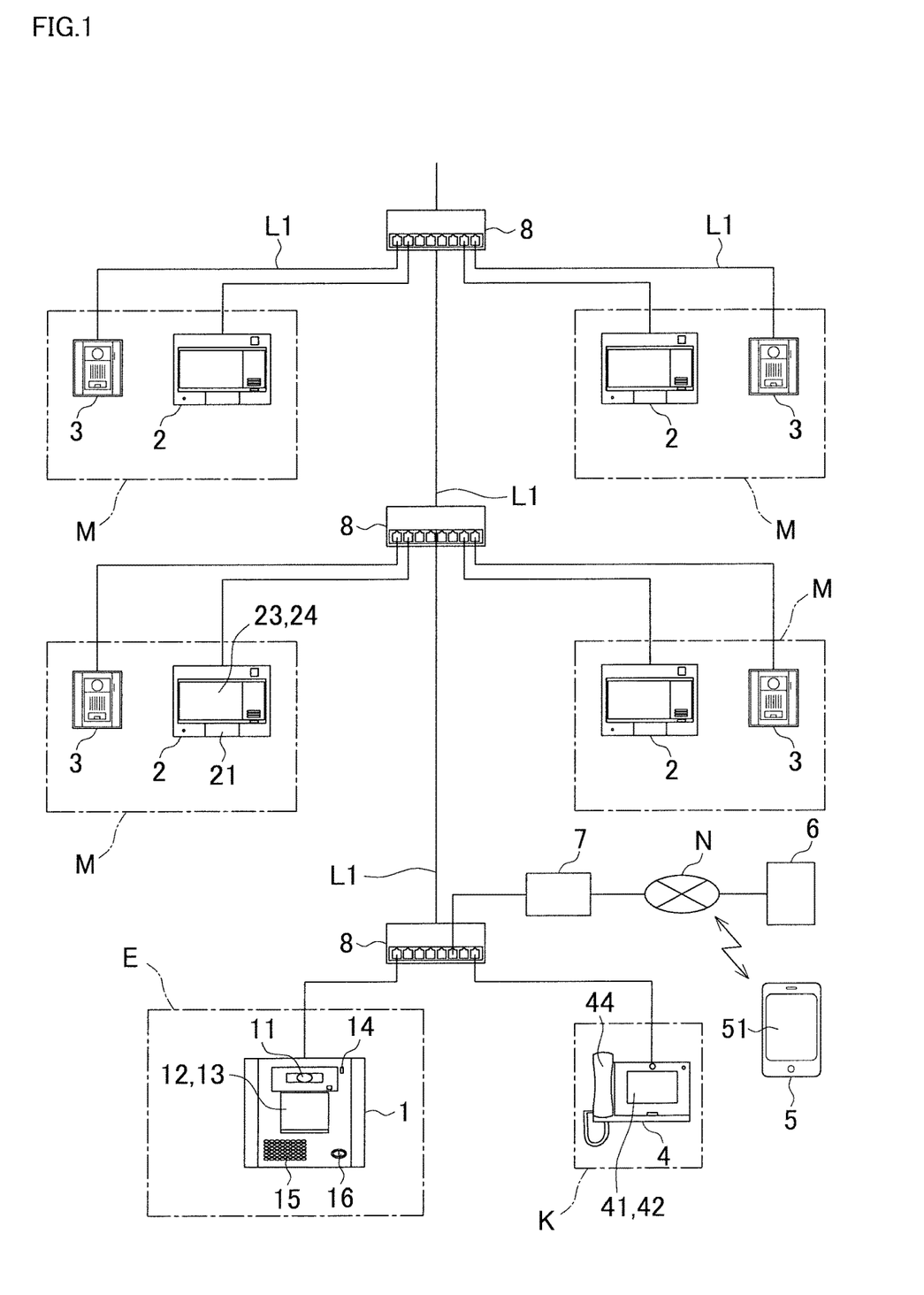
FIG. 1 is a block diagram illustrating an exemplary multiple dwelling house interphone system according to the disclosure.

The following describes embodiments in detail with reference to the drawings. FIG. 1 is a block diagram illustrating an exemplary multiple dwelling house interphone system according to the disclosure. The multiple dwelling house interphone system includes a collective entrance machine 1, dwelling room master devices 2, entrance slave devices 3, management master devices 4, a mobile phone 5, a communication management server (communication management device) 6, and the like. The collective entrance machine 1 is installed at an entrance of a multiple dwelling house and used by a visitor for calling a dweller. The dwelling room master devices 2 are installed in individual dwelling units and used for responding to calls from the collective entrance machine 1. The entrance slave devices 3 are installed at entrances of the individual dwelling units and used for calling the dwellers. The management master devices 4 are installed in a manager room and used for speaking with the dwellers and the like. The mobile phone 5 is carried by the dweller. The communication management server (communication management device) 6 is installed outside.

Reference character E indicates an entrance, reference character K indicates a manager room, and reference character M indicates a dwelling unit. Reference character 8 denotes a HUB, and the devices are mutually connected by a LAN via communication lines L1. The communication between the devices is performed by an Internet Protocol (IP). The communication management server 6 is disposed on an external general-purpose network N, and the collective entrance machine 1 and the dwelling room master device 2 are connected to the general-purpose network N via a Gateway (GW) adapter 7, thus allowing communication with the communication management server 6.

The collective entrance machine 1 includes a camera 11, an operation section 12, a display section 13, a microphone 14 and a speaker 15, a call button 16, and the like. The camera 11 obtains an image of a visitor. The operation section 12 is used for selecting or inputting a dwelling unit to be called. The display section 13 displays a calling destination and the like. The microphone 14 and the speaker 15 are used for speaking.

Figure 2:
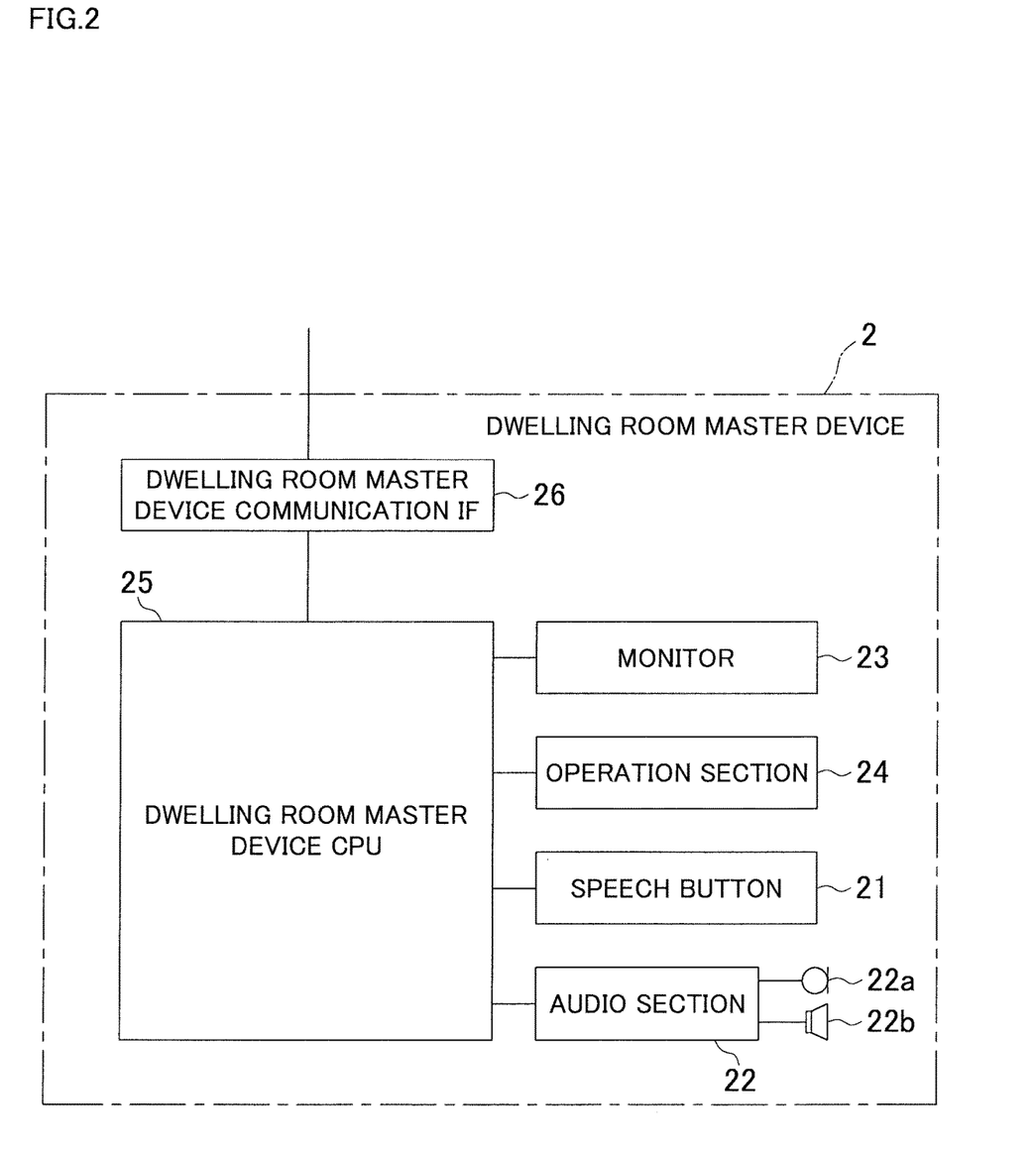
FIG. 2 is a function block diagram of a dwelling room master device.

FIG. 2 is a function block diagram of the dwelling room master device 2. The dwelling room master device 2 includes a speech button 21, an audio section 22, a monitor 23, an operation section 24, a dwelling room master device CPU 25, a dwelling room master device communication IF 26, and the like. The speech button 21 is used for responding to the calls. The audio section 22 includes a microphone 22a and a speaker 22b for speaking. The monitor 23 displays a video image obtained by the camera 11. The operation section 24 performs various operations. The dwelling room master device CPU 25 controls the dwelling room master device 2. The dwelling room master device communication IF 26 communicates with the collective entrance machine 1, the entrance slave device 3, and the communication management server 6.

For mobile phone 5 where a smartphone is used as an example, an application software (hereinafter referred to as "application") for communicating with the collective entrance machine 1 from the communication management server 6 via the general-purpose network N is downloaded and installed in the mobile phone 5. At this time, registrant information, such as name and a dwelling unit number of a dweller as an operator, is transmitted from mobile phone 5 to communication management server 6, and the registrant information is registered in association with the application. Note that the operation of downloading the application and registering it with the communication management server 6 can be easily performed by operating the dwelling room master device 2.

Specifically, first, the dwelling room master device 2 already in a communicable state with the communication management server 6 obtains a registration ticket that is preliminarily set for each dwelling unit in the communication management server 6 and includes two-dimensional information (for example, a QR code (registered trademark)) to easily perform the registration. Then, registration can be performed by displaying the obtained registration ticket on monitor 23 and reading its image with the mobile phone 5. The registration can be performed also by reading the printed registration ticket prepared for each dwelling unit in advance.

The application thus installed in the mobile phone 5 is a software for communication between the collective entrance machine 1 and the mobile phone 5, and is an application that enables communication using a VOIP technique. By using the VOIP technique, mobile phone 5 can communicate with the collective entrance machine 1 through communication not based on a telephone number.

Figure 3:
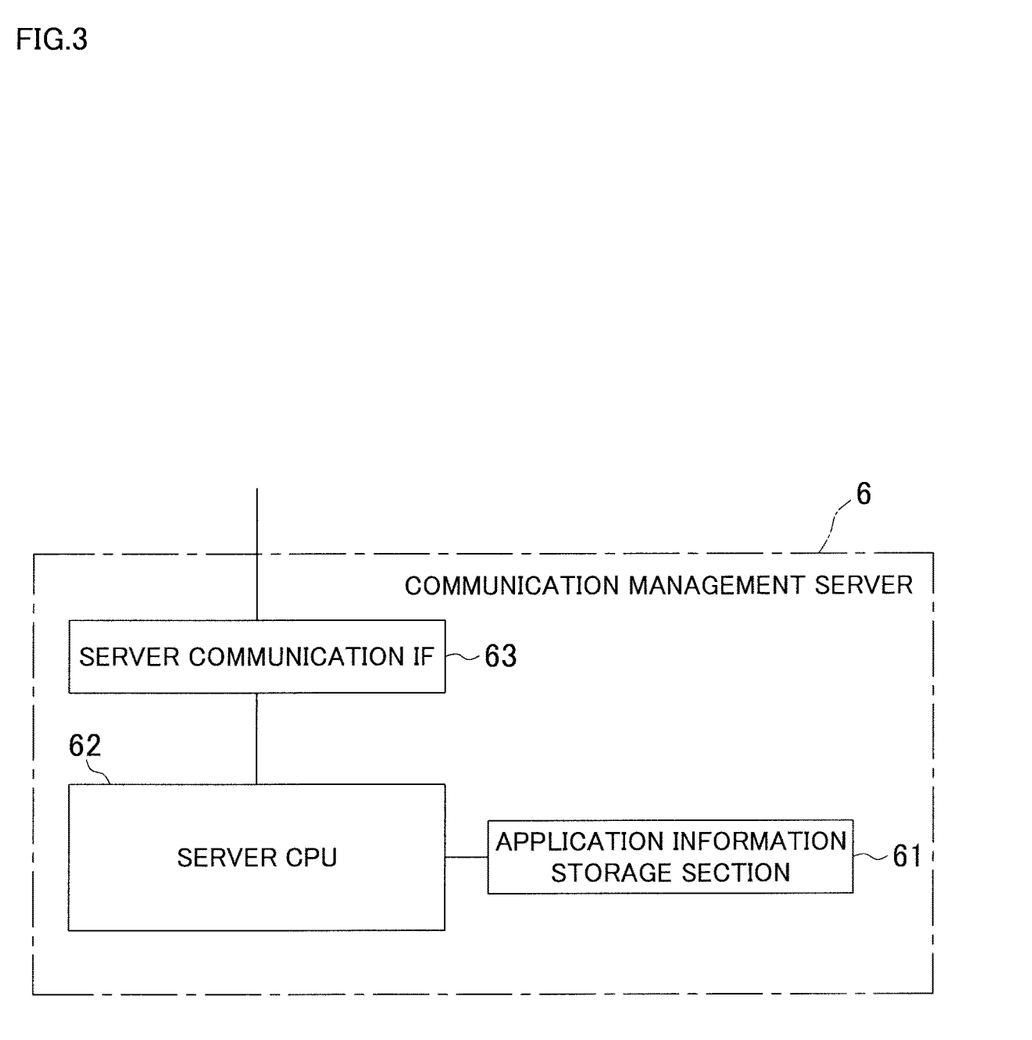
FIG. 3 is a function block diagram of a communication management server.

FIG. 3 is a function block diagram of the communication management server 6. As illustrated in FIG. 3, the communication management server 6 includes an application information storage section 61, a server CPU 62, a server communication IF 63, and the like. The server CPU 62 controls the communication between the collective entrance machine 1 and the mobile phone 5, and controls the communication management server 6. The server communication IF 63 communicates with the collective entrance machine 1 and the mobile phone 5 via the general-purpose network N.

In the application information storage section 61, the application is registered for each mobile phone 5 in association with the dwelling unit number (dwelling room master device ID), and registered further for each multiple dwelling house. When a call signal from the collective entrance machine 1 is received, the application associated with the calling destination dwelling unit is called, and the calling control causes the mobile phone 5 to perform a calling operation. That is, the call signal is transmitted to the mobile phone 5.

Operations of the multiple dwelling house interphone system configured as described above are as follows. Note that, an operation in which a dweller is called by operating the collective entrance machine 1 and the dwelling room master device 2 of the dwelling unit as the calling destination and the mobile phone 5 linked to the dwelling room master device 2 emit call sounds, an operation in which a speech path is formed by a response operation of the dwelling room master device 2 or the mobile phone 5 receiving the call thereby allowing the speaking between the dweller and the visitor, an operation in which the video image taken by the camera 11 is transmitted in response to the call and displayed on the monitor 23 of the dwelling room master device or a display section 51 of the mobile phone 5, and the like are similar to those in the conventional system. Therefore, the explanations are omitted.

Here, the procedure of the registration and deletion of registration for mobile phone 5 linked to the dwelling room master device 2 will be mainly described.

When an additional mobile phone 5 is linked to the dwelling room master device 2, the dwelling room master device 2 is operated in order to obtain information from the communication management server 6 for linking mobile phone 5. The dwelling room master device 2 is preliminarily set to be communicable with communication management server 6, and a registration notification is transmitted from the dwelling room master device 2 to the communication management server 6 by a predetermined registration operation.

The communication management server 6 receiving the registration notification recognizes the dwelling unit of the dwelling room master device 2 as a transmission source of the registration notification, and sends back registration ticket including information on an information storage destination URL of the communication management server 6 as a tool for easily performing the registration operation.

The dwelling room master device 2 receiving the registration ticket from the communication management server 6 displays it on the monitor 23. By reading the displayed registration ticket with mobile phone 5, or by manually inputting the displayed registration ticket, mobile phone 5 is allowed to communicate with the communication management server 6 via general-purpose network N, and the application is downloaded.

In the mobile phone 5 that has downloaded the application, if there are other mobile phones 5 present which are registered in the communication management server 6 in association with the dwelling room master device 2 with which the registration operation has been performed, the information will be read and displayed on the display section 51 through a function of the application.

Through the display, the presence of information on a mobile phone 5, such as a mobile phone of a former dweller needing deletion, can be recognized and a delete operation is performed after completing the registration.

Figure 4:
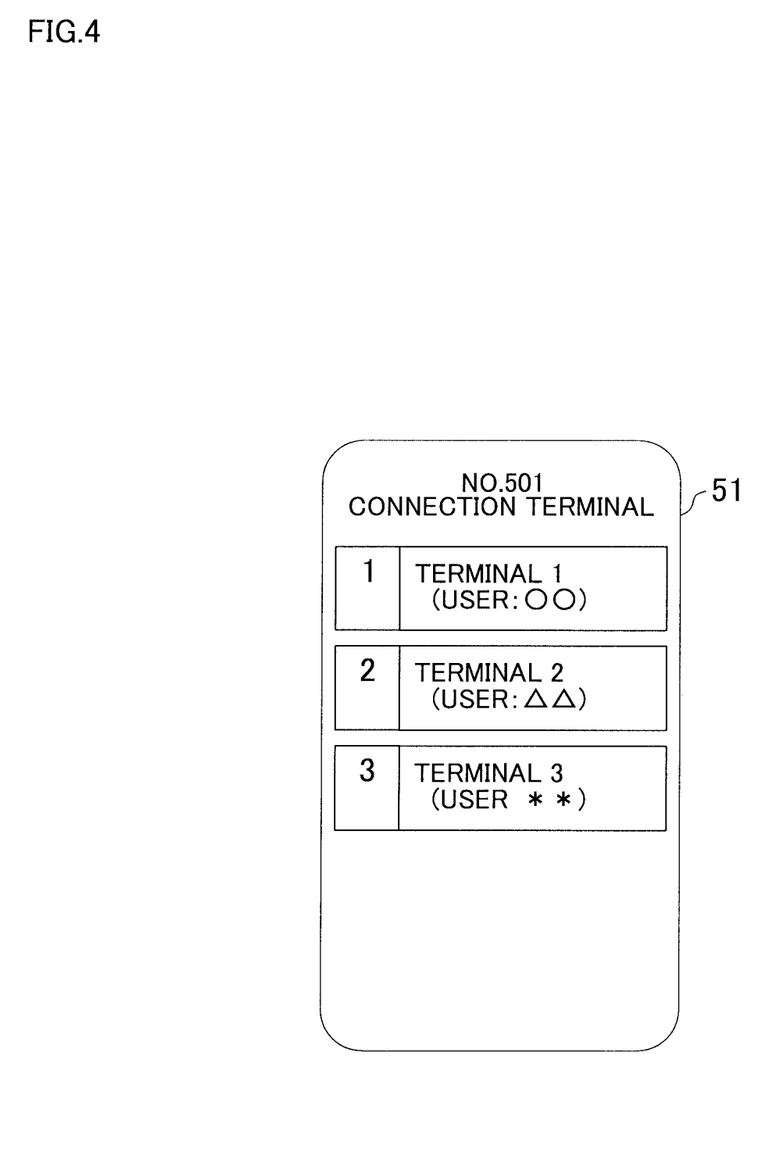
FIG. 4 is an explanatory diagram of a display screen of a mobile phone displaying information on the mobile phone registered in the communication management server.

FIG. 4 illustrates a displayed list of the mobile phones. The already registered mobile phones 5 can be recognized on the display. Here, assume that a plurality of (for example, up to eight) mobile phones can be linked to one dwelling room master device 2 (to the same dwelling unit). FIG. 4 illustrates that the three mobile phones 5 are already linked to the dwelling room master device 2 of dwelling unit 501.

While confirming the current registration situation through the display, the registration operation for the current mobile phone 5 itself can be started. At this time, an owner name and the like are input and registered in relation to an assigned terminal number (not illustrated). Thus, the additional mobile phone 5 associated with the dwelling unit number (NO. 501) is registered in the communication management server 6.

After the registration operation is completed, when the dwelling unit 501 is called from the collective entrance machine 1, the call signal is transmitted to the additionally registered mobile phone 5 in addition to the already registered mobile phones 5 by the control of the communication management server 6, and speaking becomes possible by performing the response operation.

Meanwhile, when the displayed list includes information to be deleted not related to the current dweller, the delete operation will be started.

Figure 5A:
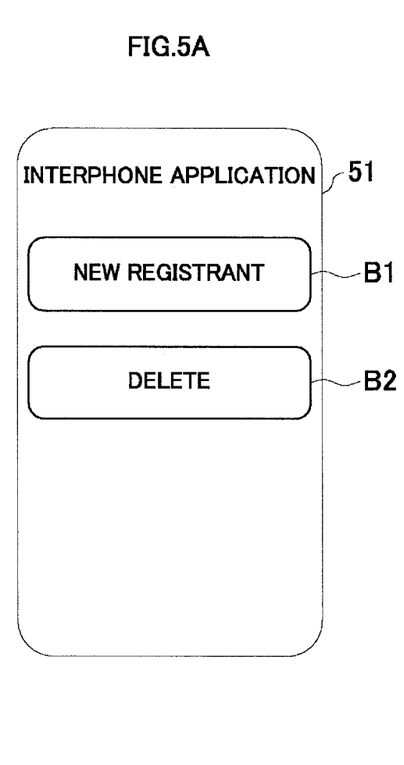
FIG. 5A is an explanatory diagram of the display screen performing a delete operation (which is also referred to as "erase operation") from the mobile phone, and illustrates a state where an application is started.
Figure 5B:
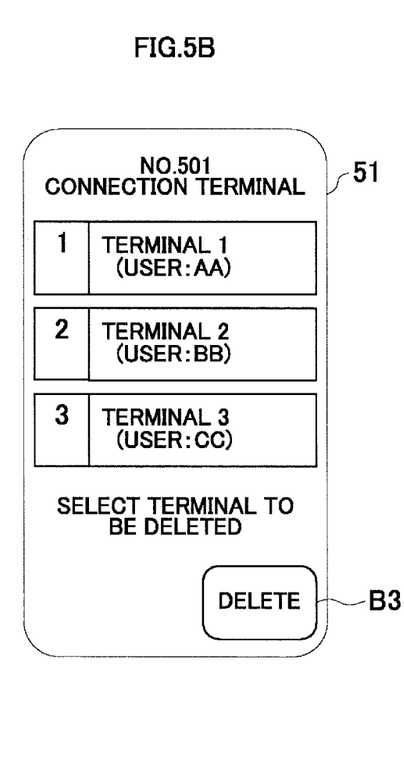
FIG. 5B is an explanatory diagram of the display screen performing a delete operation from the mobile phone, and illustrates a state where a delete operation is opened.
Figure 5C:
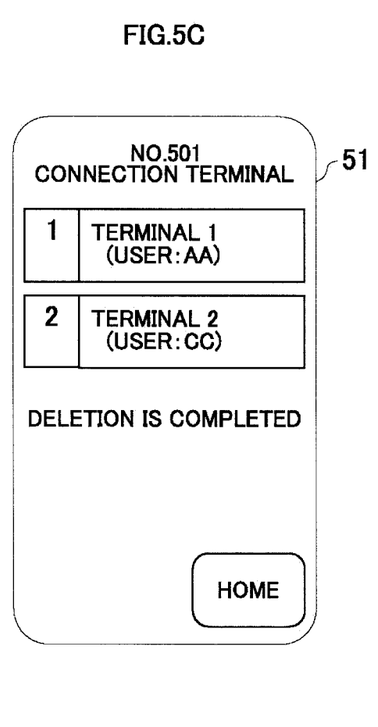
FIG. 5C is an explanatory diagram of the display screen performing a delete operation from the mobile phone, and illustrates a state where a deletion has been performed.

FIGS. 5A to 5C are explanatory diagrams of display section 51 illustrating the procedure for the delete operation. FIG. 5A illustrates a state where the application is started, FIG. 5B illustrates a state where a delete operation screen is opened, and FIG. 5C illustrates a state where the deletion has been performed. When the application in the mobile phone 5 is started, the screen of FIG. 5A is displayed at first with banners of a new registration B1 and a delete B2. The new registration is a banner used for an additional registration of a new mobile phone 5. Here, the banner of the delete B2 will be tapped for the delete operation.

In response to the tap operation of the delete B2, the information on the registered mobile phones 5 is read from the communication management server 6, and the list of registered terminals is displayed on the display section 51 as illustrated in FIG. 5B. By selecting the terminal number to be deleted in the list and tapping the delete button B3, the corresponding information in the communication management server 6 is deleted, and consequently, the list after the deletion is displayed as illustrated in FIG. 5C. Thus, the erase operation is performed.

As described above, in the process of registering mobile phone 5 as a terminal to be linked to the dwelling room master device 2, the information already registered in the communication management server 6 is displayed on the newly registered mobile phone 5. If undeleted registered information on a former dweller remains when a new dweller moves in, it can be noticed. Accordingly, it can be easily recognized if information needing erasure remains, thus allowing certain erasure of information on the former dweller when registering the information on the new dweller.

Then, since the information registered in the communication management server 6 can be displayed on the mobile phone 5, and any piece of information in the registered information can be deleted, unnecessary information can be erased for certain by a simple operation.

Since the registration can be performed using the registration ticket displayed on the dwelling room master device 2, the registration can be made with a simple operation.

Figure 6:
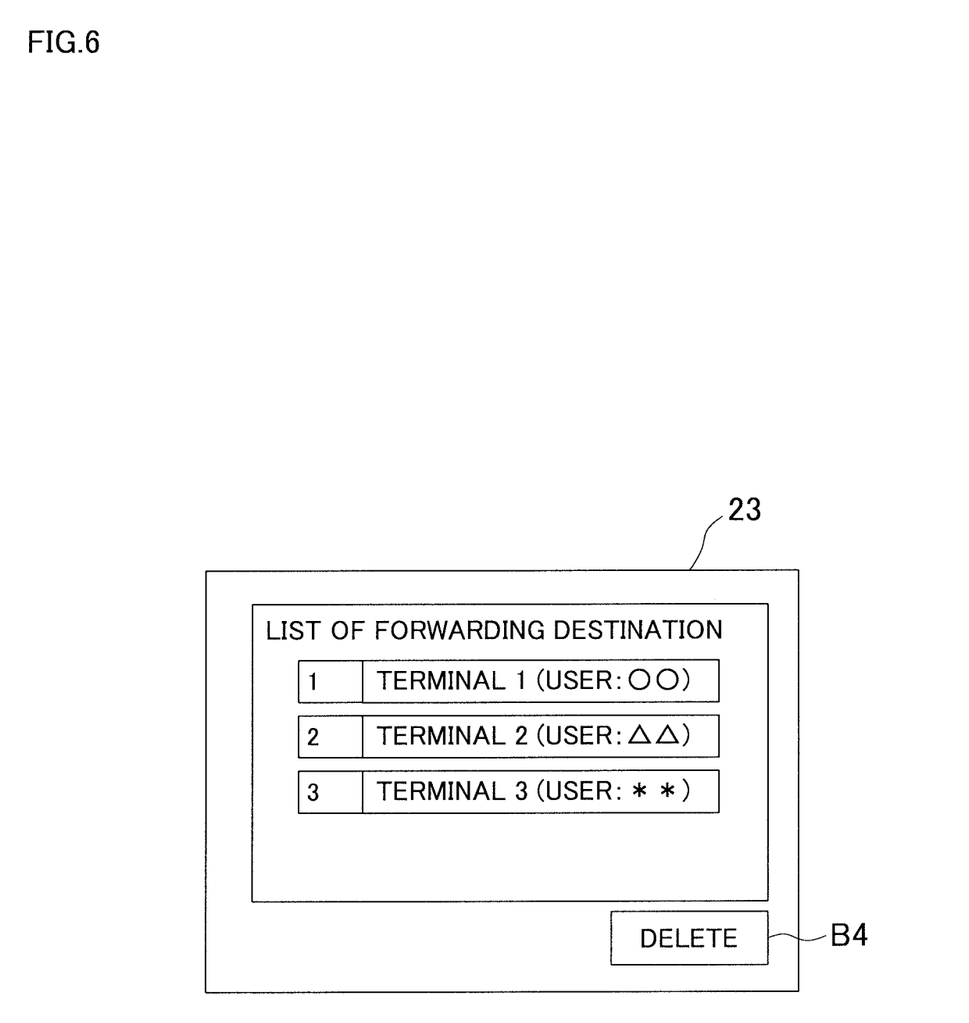
FIG. 6 is an explanatory diagram of the screen when the delete operation is performed by operating the dwelling room master device.

FIG. 6 illustrates the display when the deletion is performed by operating the dwelling room master device 2. Through a predetermined operation of the operation section 24, the mobile phones 5 linked to the dwelling room master device 2 are displayed in a list of forwarding destination terminals as illustrated in FIG. 6, and a delete button B4 is displayed together. By selecting the terminal as an erasure target and tapping the delete button B4 on the display, the erasure can be performed in a manner similar to the delete operation using mobile phone 5.

As described above, the dwelling room master device 2 can obtain and display the information list on the mobile phones 5 set to be linked to the dwelling room master device 2 itself, and further, the dwelling room master device 2 can erase the information on any of the mobile phones 5 among them. Therefore, the information needing erasure can be easily obtained, and unnecessary information can be erased through a simple operation.

Next, a description will be given of a case of a multiple dwelling house interphone system having a configuration in which the fixed dwelling room master device 2, which is disposed in the above-described configuration, is not disposed and a response to a call from the collective entrance machine 1 is performed through only the mobile phone 5.

When the dwelling room master device is not disposed and a device for response is only the mobile phone 5, the registration and deletion of registration is performed as follows. The registration ticket is registered for each dwelling unit (for each dwelling unit number) in the communication management server 6, and the registration ticket is prepared by, for example, printing it on a card for each dwelling unit.

For the mobile phone 5 used as a terminal to respond to the call from the collective entrance machine 1, the registration is performed by reading the printed registration ticket. The procedure of registration after the reading and the procedure of deletion are similar to the procedures in the above-described case of reading the registration ticket displayed on the dwelling room master device 2.

Accordingly, after the predetermined application has been downloaded, if there is a mobile phone 5 registered in the communication management server 6 in association with the registration ticket, that is, in association with the dwelling unit number, its information is read and displayed on the display section 51 through a function of the application. Based on the display, if there is information on mobile phone 5 needing erasure, such as the mobile phone of the former dweller, the delete operation is performed after the registration.

As described above, when the mobile phone 5 is registered as a terminal that can respond to calls from the collective entrance machine 1, the information already registered in the communication management server 6 is displayed. If undeleted registered information on a former dweller remains when a new dweller moves in, it can be recognized. Accordingly, the information needing erasure may easily be grasped, and a situation in which information of the former dweller remains when the information on the new dweller is registered can be prevented.

While the QR code (registered trademark) is described as an example of the registration ticket to facilitate the registration in the above-described embodiments, the registration ticket is not limited insofar as it is two-dimensional information. The registration ticket may be a simple barcode, or a numerical string or a symbol string may be used.

While the communication management server 6 is disposed on the general-purpose network N, the communication management server 6 may be installed in the multiple dwelling house.

The invention claimed is:

1. A multiple dwelling house interphone system configured to respond to a call from a collective entrance machine installed at an entrance by not only a dwelling room master device installed in an individual dwelling unit but also a mobile phone carried by a dweller, the multiple dwelling house interphone system comprising:
   a communication management device that transmits a call signal from the collective entrance machine to the mobile phone and controls communication between the collective entrance machine and the mobile phone,
   wherein the communication management device relays the communication to the mobile phone registered as a calling destination of the collective entrance machine so as to be linked to the dwelling room master device using a predetermined application based on a VOIP (Voice Over Internet Protocol),
   wherein when a predetermined registration operation to allow the communication with the communication management device based on the VOIP is performed to link the mobile phone to the dwelling room master device, wherein an information list of mobile phones that are already registered relative to the dwelling room master device as a link target is transmitted from the communication management device having accepted the registration in addition to an application for a download, and wherein the mobile phone that has downloaded the application displays the information list on a display section of the mobile phone.

2. The multiple dwelling house interphone system according to claim 1, wherein in the mobile phone that has downloaded the application and is linked to the dwelling room master device, wherein when the application is started, the information list is displayed on the display section, and a delete button configured to delete any piece of information in the information list is displayed, and wherein any piece of information in the displayed list information can be deleted.

3. The multiple dwelling house interphone system according to claim 2, wherein the dwelling room master device includes:

a registration operation section that obtains a ticket for registering the mobile phone in the communication management device; and a monitor that displays the obtained registration ticket, and wherein the registration operation of the mobile phone is an operation to read the registration ticket displayed on the dwelling room master device.

4. The multiple dwelling house interphone system according claim 2, wherein the dwelling room master device is configured to display the information list of the mobile phones that are already registered to be linked to the dwelling room master device itself in the communication management device by a predetermined operation, and wherein the dwelling room master device further includes an erase operation section configured to delete any piece of information in the displayed information list.

5. The multiple dwelling house interphone system according to claim 1, wherein the dwelling room master device includes:

a registration operation section that obtains a ticket for registering the mobile phone in the communication management device; and a monitor that displays the obtained registration ticket, and wherein the registration operation of the mobile phone is an operation to read the registration ticket displayed on the dwelling room master device.

6. The multiple dwelling house interphone system according to claim 5, wherein the dwelling room master device is configured to display the information list of the mobile phones that are already registered to be linked to the dwelling room master device itself in the communication management device by a predetermined operation, and wherein the dwelling room master device further includes an erase operation section configured to delete any piece of information in the displayed information list.

7. The multiple dwelling house interphone system according to claim 1, wherein the dwelling room master device is configured to display the information list of the mobile phones that are already registered to be linked to the dwelling room master device itself in the communication management device by a predetermined operation, and wherein the dwelling room master device further includes an erase operation section configured to delete any piece of information in the displayed information list.

8. A multiple dwelling house interphone system comprising:

a collective entrance machine installed at an entrance to call a dweller;

a terminal configured to respond to the call from the collective entrance machine via an external network, a dweller being allowed to carry the terminal; and a communication management device that controls communication between the collective entrance machine and the terminal, wherein the terminal is a mobile phone configured to perform communication based on a VOIP (Voice Over Internet Protocol), wherein the mobile phone as a calling destination is registered in the communication management device in association with a dwelling unit number, and the communication management device relays the communication between the collective entrance machine and the mobile phone using a predetermined application that uses the VOIP, wherein the mobile phone is allowed to download an application to communicate with the communication management device based on the VOIP by a predetermined operation, and wherein an information list of mobile phones that are already registered in the communication management device in association with the registered dwelling unit numbers is displayed on the mobile phone that has downloaded the application.

* * * * *